(12) United States Patent
Kolze (10) Patent No.: US 6,457,697 B1
(45) Date of Patent: Oct. 1, 2002

(54) FOREIGN PARTICLE RESISTANT VALVE

(75) Inventor: Lawrence A. Kolze, Seneca, SC (US)

(73) Assignee: Kolze, Inc., Seneca, SC (US)

( * ) Notice: Subject to any disclaimer, the term of this patent is extended or adjusted under 35 U.S.C. 154(b) by 0 days.

(21) Appl. No.: 09/954,061

(22) Filed: Sep. 18, 2001

(51) Int. Cl.[7] ............................................. F16K 31/12
(52) U.S. Cl. .................. 251/30.03; 251/30.02
(58) Field of Search ............................. 251/25, 30.01, 251/30.02, 30.03

(56) References Cited

U.S. PATENT DOCUMENTS

| | | | | |
|---|---|---|---|---|
| 3,155,366 A | * | 11/1964 | Rasmussen | 137/490 |
| 3,593,956 A | * | 7/1971 | McCarty, Jr. | 251/30.03 |
| 3,662,779 A | * | 5/1972 | Weber et al. | 137/489 |
| 3,672,627 A | | 6/1972 | McCarty, Jr. et al. | |
| 4,175,590 A | * | 11/1979 | Grandclement | 137/883 |
| 4,196,751 A | * | 4/1980 | Fischer et al. | 137/625.65 |
| 4,268,006 A | * | 5/1981 | Kunz et al. | 236/68 R |
| 4,844,112 A | | 7/1989 | Pick et al. | |
| 4,981,155 A | | 1/1991 | Pick et al. | |
| 5,145,145 A | | 9/1992 | Pick et al. | |
| 5,732,929 A | * | 3/1998 | Luppino et al. | 138/42 |
| 6,076,550 A | * | 6/2000 | Hiraishi et al. | 137/550 |
| 6,234,449 B1 | * | 5/2001 | Ortner et al. | 251/30.03 |

* cited by examiner

*Primary Examiner*—Henry C. Yuen
*Assistant Examiner*—David Austin Bonderer (57) ABSTRACT

An improved foreign particle resistant valve assembly having a pressure responsive diaphragm main valve member activated by a pilot valve which controls flow through small orifice passages whereby pressure forces are created across the diaphragm main valve member to permit and prevent flow through the main flow section of the valve. Several arrangements illustrate various configured foreign particle-screening passages that protect the pilot valve orifice passages from blockage. The screening may be an integral part of the valve body or may be a removable member to facilitate cleaning or manufacture, and may be adapted to metallic or plastic valves. Other embodiments provide the means to enlarge a pilot pressure drop orifice passage which would then be less susceptible to foreign particle blockage and could also be combined with the screening passage means of the first embodiment.

16 Claims, 7 Drawing Sheets

FOREIGN PARTICLE RESISTANT VALVE

BACKGROUND OF INVENTION

The present invention relates primarily to improvements in the prevention of foreign particle blockage of the small pilot passages in pilot operated valves where the pilot actuator controls flow through an orifice to create pressure differential forces across a flexible diaphragm which acts as a main valve to permit and prevent flow through the main flow ports. These types of valves are economical in cost and are used in many applications and the state of art of their operation is well known, as is their susceptibility to malfunction when their relatively small pilot passages become blocked by foreign particles or other contaminants.

Special attention is therefore paid to provide the best possible means for protection of these pilot flow sections from foreign particle contamination. Use of wire screening at the main flow inlet port does not offer full protection for these pilot passages as this screen size is necessarily made large to only trap major particles as a smaller mesh screen would fully clog in very short operational time intervals. The inlet flow screens are therefore compromised to allow passage of foreign particles that can enter the pilot flow section and cause overall valve malfunction. To overcome this difficulty, these valves have been fitted with an additional pilot valve section screening means which prevents the smaller foreign particles which have passed through the main inlet flow screen to enter and block the pilot sections. An example of this screen means is shown in U.S. Pat. No. 3,672,627 by McCarty et al, where the screening means is provided by a plurality of small holes formed through the diaphragm before flow entry to the pilot section. A more recent example are U.S. Pat. No. 4,844,112, 4,981,155, and 5,145,145 by J. Pick, et al, where pilot screen means are provided by circumferentially placed groves within a valve cavity and with a mating member forms a plurality of small grooved openings where pilot fluid may flow and may effectively trap foreign particles. The merits of the screen means given by Pick indicate some superior advantages over that shown by McCarty, however, the Pick design would still seem to have particular deficiencies in the dimensional tolerance control of the illustrated circumferential bleed passages, the ability to clean the pilot valve screening, difficulty in adopting this means to other than plastic body valves, and its probable high cost. In addition, both the McCarty and Pick approaches require screen passage sizes smaller than the bleed hole to effectively provide valve foreign particle protection. The necessity to provide the very small screen passages as usually required by the single small bleed hole size make both of these approaches somewhat difficult to attain.

To overcome the difficulties of the prior art described, the objectives of this invention are to: (1) provide a pilot valve having improved screen dimensional size tolerance control, be removable for field service cleaning, and be adaptable for use with either plastic or metal valve bodies, and (2) have provision for an enlarged pilot flow passage means which would permit the use of larger pilot screen passages for ease of manufacture, cost effectiveness and possess the overall ability to prevent a pilot valve passage blockage that would cause a failure to close of the main valve member.

BRIEF SUMMARY OF INVENTION

The present invention focuses primarily on two basic methods to prevent foreign particle orifice passage blockage of a pilot operated valve that controls differential pressures across a pressure sensitive member such as a diaphragm having a poppet seat to open and close a main flow port of the valve. As is well understood by those knowledgeable in the state of the art of these valves, a blockage of the upstream orifice or bleed orifice of this pilot flow passage will cause a failure to close condition of the main valve port and could thereby lead to flooding and property damage. On the other hand, a blockage of the downstream or pilot actuator orifice results in a failure to open or a closed main valve position, and although not desirable, is not usually as serious as with a blockage of the upstream orifice. Agrevating the possible failure to close problem is that the upstream orifice is, by diaphragm operation necessity, made smaller than the downstream pilot actuator orifice and is therefore the most susceptible to foreign particle blockage. To overcome this major problem, one method utilized in the present invention provides a screening means which will only permit passage of particles small enough to harmlessly pass through the upstream pilot orifice and another method provides a means whereby this upstream orifice has been enlarged so that it no longer is the minimum pilot passage area and therefore becomes less prone to the foreign particle blockage condition. In the screening method, an arrangement of small screening passages are formed between the periphery of the diaphragm seal and the valve body while another screen version utilizes a removable plastic screening member to facilitate its fabrication and service cleaning and can also be adapted to either a plastic or metal body. In the latter version, the screen passages are formed between the valve body and the removable member which is sandwiched between the outer peripheral seal of the diaphragm and valve body. In still another version, the screening passages are formed in the central portion of the flexible diaphragm. In all versions the means whereby the screen passages are formed permit a very precise dimensional tolerance control and thereby assure proper foreign particle screening of the pilot flow orifice passages.

A second approach toward minimizing pilot valve foreign particle orifice blockage utilizes a series connected enlarged orifice passages which together produce an equivalent pressure drop of a single small orifice. By this arrangement, a larger bleed hole passage can be used which results in a much larger orifice passage area and thereby makes this passage much less likely to become blocked and also permits the use of less critical and larger size screen passages. In addition, the series orifice passage diameters can tolerate considerably more tolerance variability than that allowed for a single bleed orifice and thereby also improves the dimensional control of the pilot valve bleed orifice. In the series orifice passage embodiment, three versions are illustrated, one provides the passages in the peripheral rim of the diaphragm, a second version provides these series passages in a separate elastomeric ring, and a third version illustrates the series connected passages in the central portion of the diaphragm. In the second and third versions, the series bleed passages can be placed downstream of the screening passages to add an extra protective margin against possible foreign particle blockage of the bleed passage. The series orifice bleed passages provide the simplest means to attain the larger bleed passages, but a further enlargement of these passages may be achieved by the addition of a vortex flow means with each series orifice. Vortex flow restrictors add an extra pressure drop to a simple orifice and are well known configurations by persons familiar in the state of the art of fluid flow and are therefore not more fully explained or illustrated but are mentioned as an option to add extra pressure drop to the series orifice passages if needed in an application of the invention.

Whether the series connected passages are simple connected orifice passages or of the vortex configurations, and the screen means are of various patterns, all of these configurations can be suitably manufactured and can thereby be economically incorporated into a pilot operated valve assembly.

In some applications, foreign particle protection may not be a critical condition and in these cases the series connected pressure drop passages could be dimensionally the same as that used in a single orifice but would result in a greater pressure differential across the pressure responsive main valve member. This would permit use of a smaller diameter pilot valve seat and thereby reduce the required actuation lift force which in turn would permit the use of a more economical pilot valve actuator. The improved series connected passages so sized and combined with the improved screening means described previously would provide additional benefit of the described invention.

Therefore, the present invention as described, has thus achieved its objectives of improving a pilot operated valve assembly for improved resistance against foreign particle bleed passage blockage by: (1) an improved pilot screening means, (2) an enlarged bleed orifice passage less susceptible to foreign particle blockage, (3) provision to permit removal of foreign particle screen means for service cleaning, (4) providing an improved dimensional control of the pilot bleed passage, and (5) the capability to incorporate the foreign particle protection improvements into either plastic or metal valve bodies.

BRIEF DESCRIPTION OF DRAWINGS

FIG. 7 is a cross-section view of another embodiment of the invention incorporating a number of series connected orifice passages in the outer bead of the diaphragm. FIG. 7 is also shown along section indicating lines 7—7 of FIGS. 8 and 9;

FIG. 10 is a cross-section view of an alternative means of FIG. 7 to form a series of connected orifice passages in a ring member positioned between the outer diameter of the valve cover and housing bore. FIG. 10 is also shown along section indicating lines 10—10 of FIG. 11;

DERAILED DESCRIPTION

Figure 1:
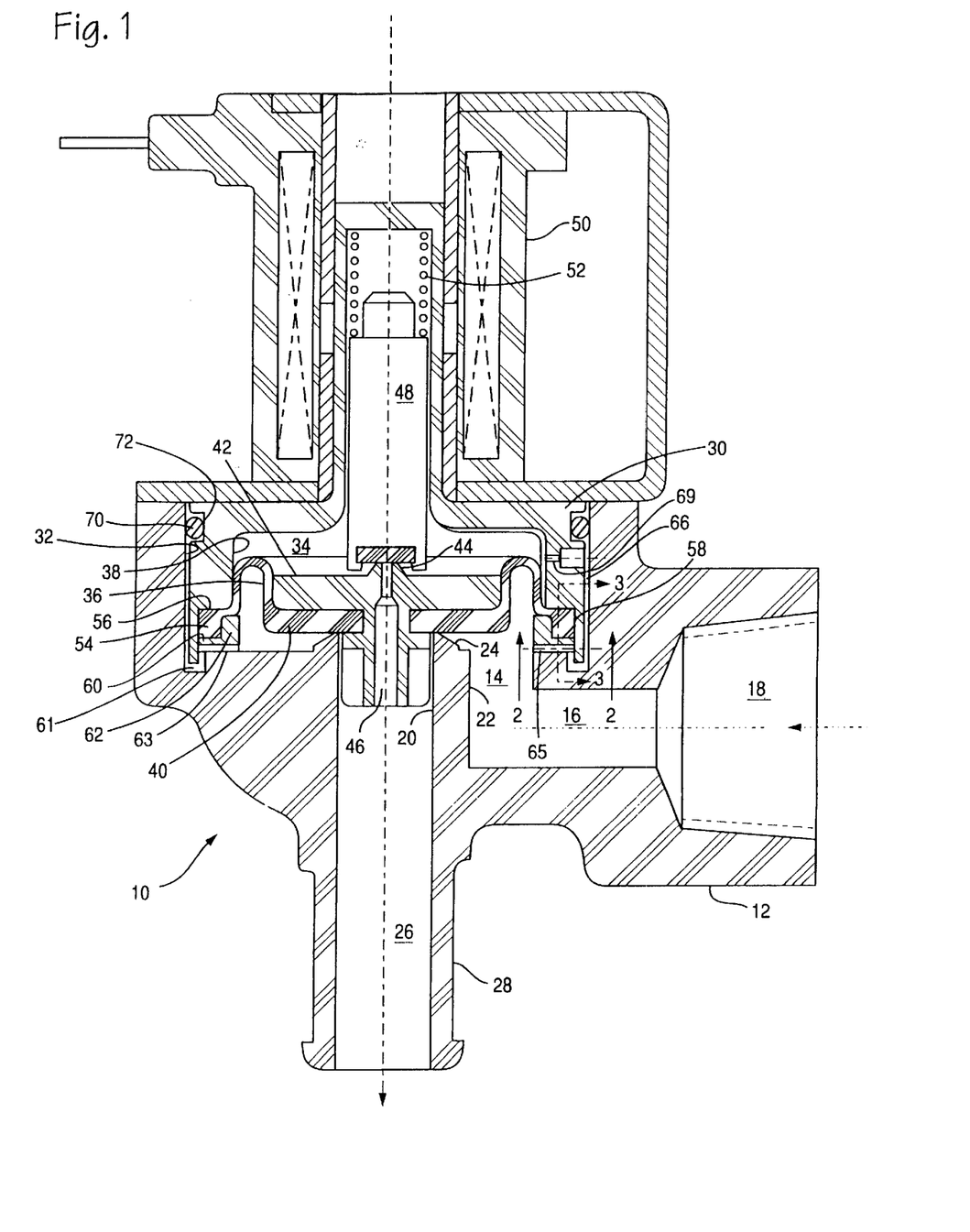
FIG. 1 is a cross-section of a pilot operated diaphragm valve assembly of the present invention.

Reference to FIG. 1, the valve assembly of the present invention is indicated generally indicated at 10 and has a housing 12 of a plastic or metal material, and a main valve chamber 14 which communicates with passage 16 and inlet 18. An outlet bore 20 is formed in a boss 22 extending into chamber 14 and terminates in valve seat 24. Outlet bore 20 communicates with outlet passage 26 to permit fluid flow to outlet 28 when valve 10 is operated to open.

Figure 2A:
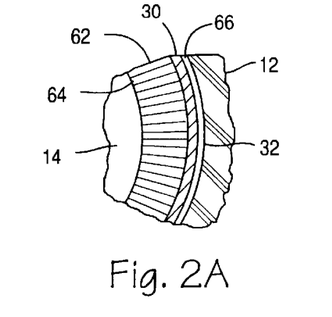
FIGS. 2A, 2B, and 2C illustrate screen passage variations taken along section indicating lines 2—2 of FIG. 1.
Figure 2B:
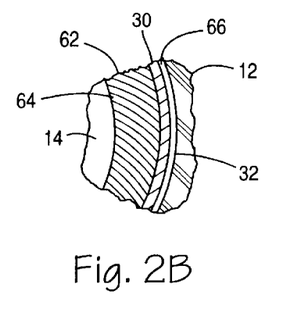
Figure 2C:
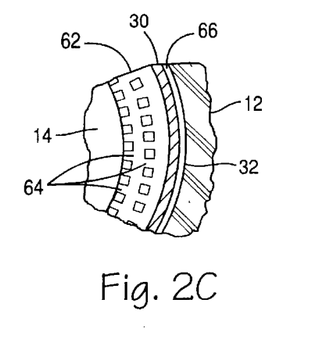
Figure 3:
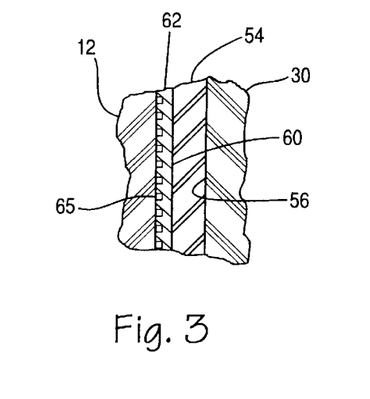
FIG. 3 is a portion of a section view taken along section indicating lines 3—3 of FIG. 1.

A cover 30 having a bore 38 is received within bore 32 of the housing 12 and forms a pilot chamber 34 with flexible diaphragm 36 and bore 38. Pilot chamber 34 is separated from chamber 14 by flexible diaphragm 36, which has a main valve member 40 for movably contacting valve seat 24. Valve member 40, comprising the central portion of flexible diaphragm 36 has received therethrough an insert 42 which extends into bore 20 for sliding engagement with the wall thereof to thus act as a guide for movement of valve member 40. The pilot chamber side of insert 42 has a pilot seat 44 formed thereon with a pilot flow passage 46 communicating, said pilot chamber 34 and outlet passage 26 when said pilot seat 44 is opened. An actuator 48 when lifted by an electromagnetic force upon energization of coil 50 opens said pilot seat 44 to permit flow through pilot passage 46 and upon de-energization of coil 50 causes actuator 48 lift force to be removed and bias spring 52 moves said actuator 48 to close pilot seat 44 and prevent flow through pilot passage 46. The outer periphery of diaphragm 36 has a bead 54 formed therearound and is sandwiched between surface 56 at the bottom of counterbore 58 of cover 30 and upper surface 60 of plastic ring member 62. Ring member 62 is sandwiched between bead 54 of diaphragm 36 and surface 63 formed at bottom of bore 32 in housing 12. Referring also to FIGS. 2A, 2B, 2C, and 3, a plurality of channels 64 formed in bottom surface of plastic ring member 62 and with surface 63 form a plurality of passages 65, that communicate chamber 14, annular groove 61, and clearance 66 formed between bore 32 of housing 12 and outer diameter of cover 30. A pilot bleed passage 69 is formed through wall of cover 30 and communicates pilot chamber 34 with clearance 66. An elastomeric ring seal 70 is received within an annular groove 72 in cover 30 to provide a fluid seal between cover 30 and bore 32 of housing 12. FIGS. 2A, 2B, and 2C, also illustrate the variety of the pattern of channels 64 that can be formed on ring member 62 which when placed in contact with surface 63 at the bottom of the bore 32 of housing 12 form thereabout a plurality of passages 65 that are dimensionally smaller than said pilot bleed passage 69 and thereby act as a screening means to prevent foreign particle entry and blockage of bleed passage 69. FIG. 3 illustrates the cross-sectional view of passages 65 that form the screening means of the configurations of FIGS. 2A, 2B, and 2C.

Figure 4:
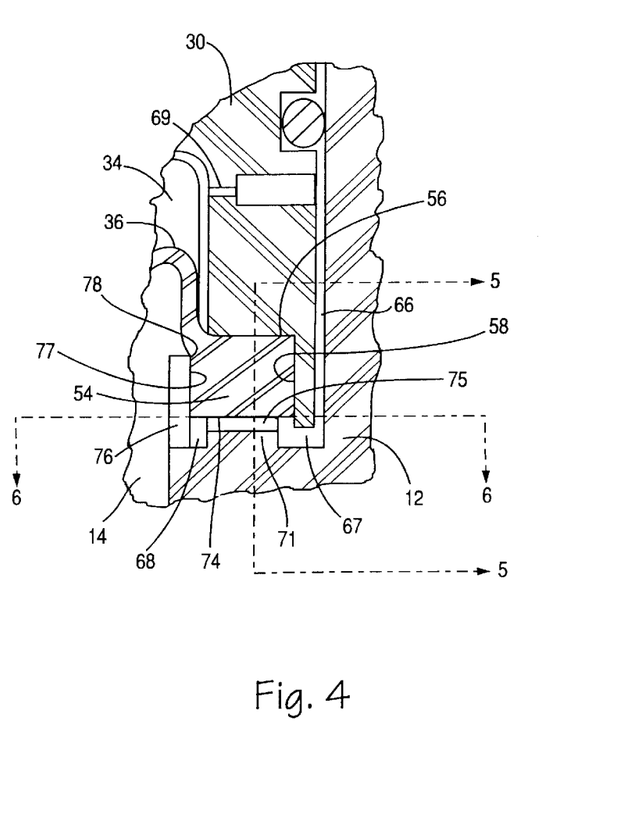
FIG. 4 is a portion of the FIG. 1 cross-section illustrating an alternative construction at the outer beard section of the diaphragm.
Figure 5:
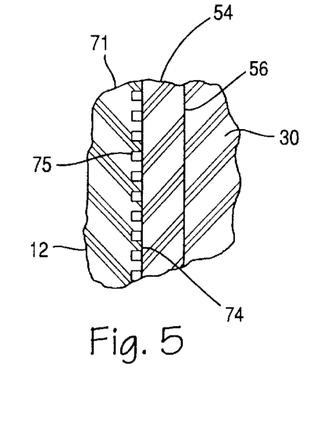
FIG. 5 is a portion of a section view taken along section indicating lines 5—5 of FIG. 4.
Figures 6, 8:
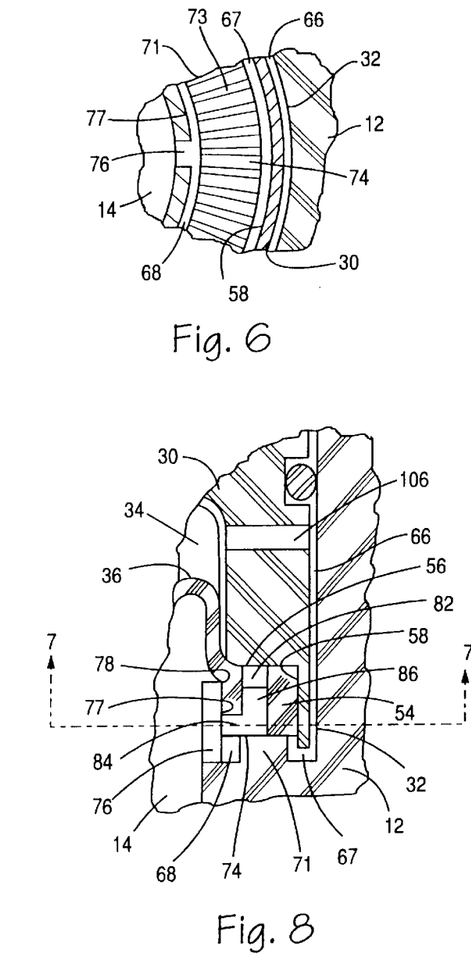
FIG. 6 is a portion of a section view taken along section indicating lines 6—6 of FIG. 4.
FIG. 8 is a section view taken along section indicating lines 8—8 of FIG. 7.

Referring to FIGS. 4, 5, and 6, an alternative screen means is shown without ring member 62 (FIG. 4) where the pattern of channels 73 (FIG. 6) are formed in a top surface 74 of a boss 71 formed at the bottom of bore 32 of housing 12. When diaphragm 36 is received in housing 12 and the bead 54 of diaphragm 36 contacts top surface 74 with the pattern of channels 73 formed thereon provide a plurality of screen passages 75 dimensionally sized to prevent foreign particle entry and blockage of said bleed passage 69.

Referring again to FIGS. 4, 5, and 6, screen passages 75 communicate with annular grooves 68 and 67 formed adjacent and concentric with boss 71 and provide flow entry and exit to passages 75 to effectively distribute the screening function to all said passages 75 and thereby prolong the life of the screening means. Diaphragm bead 54 of diaphragm 36 is laterally retained between counterbore 58 of cover 30 and the extension 78 of the inner diameter 77 of annular groove 68. A slotted passage 76 communicates chamber 14 to annular groove 68, passages 75, annular groove 67, clearance space 66, and pilot chamber 34, said passages 75 dimensionally sized to provide an effective screen means to prevent blockage of pilot bleed passage 69.

The screening means as illustrated in FIGS. 1 through 6 provide a very precise means to control the screening passage sizes since the passages are of a small single tolerance dimension formed in only one member contacting a simple flat surface. The dimensional value of the formed passages 65 or 75 may be in a 0.005 to 0.010 inch range where the permissible deviation in fabrication would be very small, possibly no greater than ±0.0005 inch, and therefore would provide a very precise dimensional control of screen cross-sectional passage area.

Figure 7:
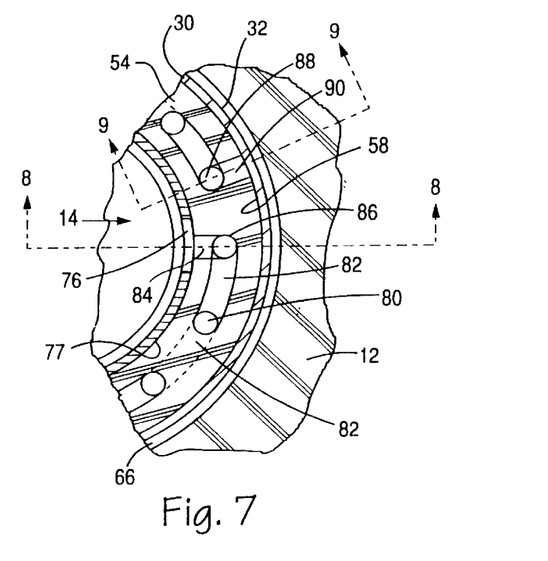
Figure 9:
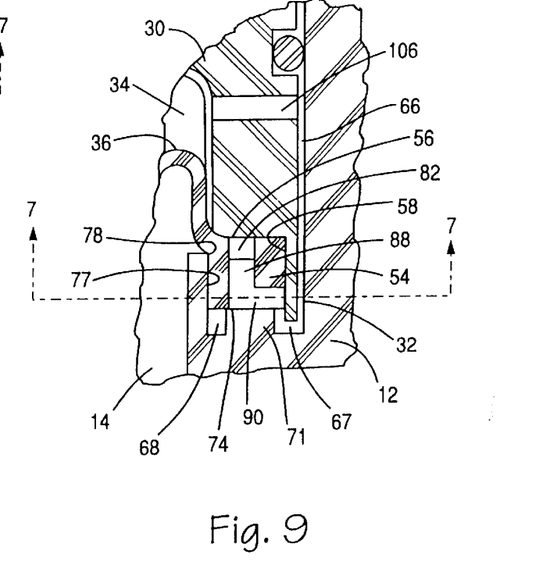
FIG. 9 is a section view taken along section indicating lines 9—9 of FIG. 7.
Figure 10:
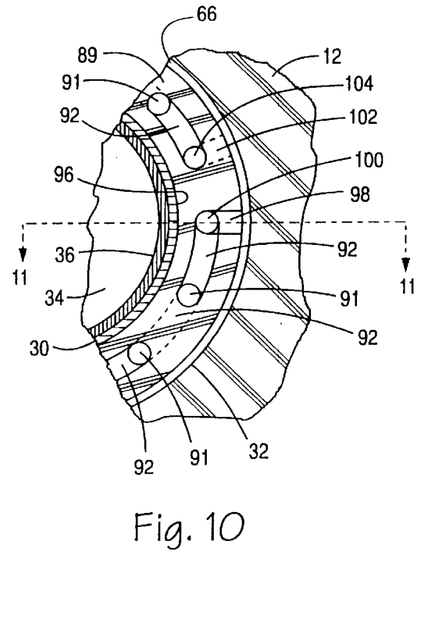
Figure 11:
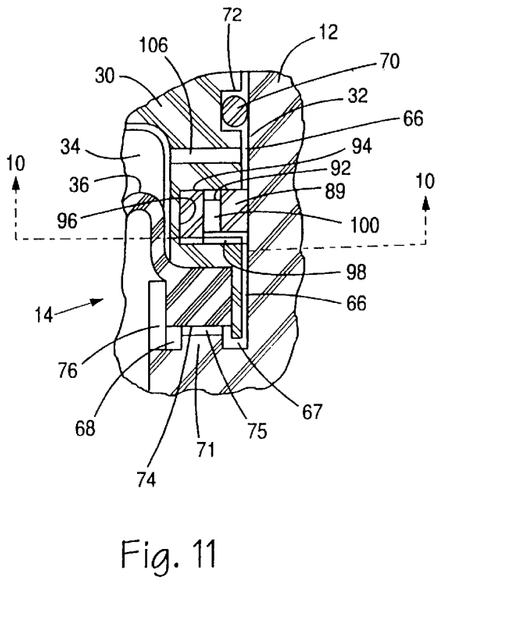
FIG. 11 is a section view taken along section indicating lines 11—11 of FIG. 10.
Figure 12:
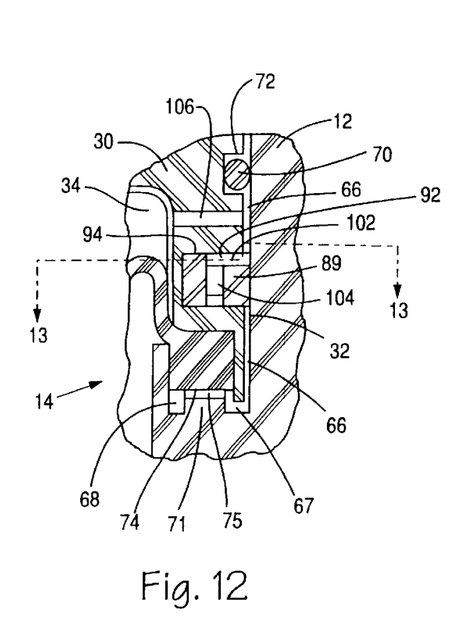
FIG. 12 is a section view taken along section indicating lines 12—12 of FIG. 13.
Figure 13:
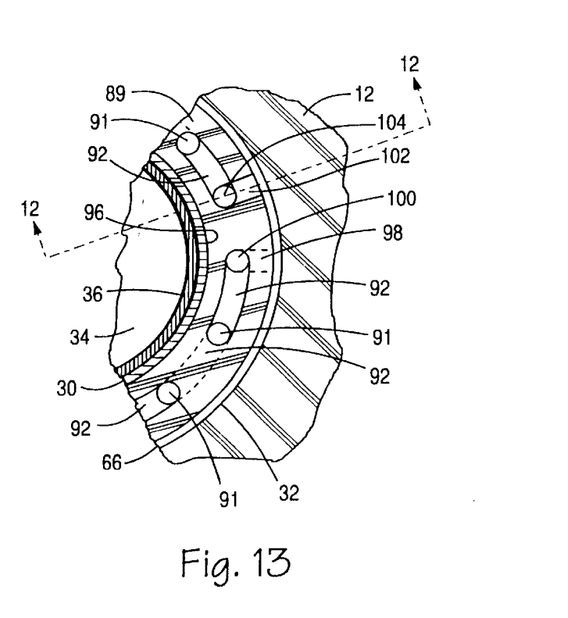
FIG. 13 is a section view taken along section indicating lines 13—13 of FIG. 12.

Referring again to FIG. 1 and also to FIGS. 7, 8, and 9; an arrangement is shown where the bead 54 of diaphragm 36 comprises a plurality of orifice passages 80 formed with channels 82 spaced circumferentially about bead 54. Channels 82 alternately connect the opposite sides of said orifice passages 80 in a series relationship where bead 54 of diaphragm 36 is received between surface 74 at top of boss 71 and surface 56 of counterbore 58 of cover 30 to form a restrictive pilot flow path and to provide the pressure drop means across diaphragm 36 to actuate said pressure responsive flexible diaphragm 36 and valve member 40, the said restricted pilot flow path communicating chamber 14 to pilot chamber 34 via a slotted passage 76, annular groove 68, a slotted inlet passage 84 formed in bead 54 of diaphragm 36 with surface 74 to the inlet orifice 86 of said series orifice passages 80 and channels 82, exit orifice 88, slotted outlet passage 90 formed in bead 54 of diaphragm 36 with surface 74, annular passage 67, clearance 66, pilot passage 106, and to pilot chamber 34.

Referring again to FIG. 1 and also to FIGS. 10, 11, 12, and 13, another arrangement is shown where an elastomeric ring 89 comprises a plurality of orifice passages 91 and channels 92 formed therein and spaced circumferentially thereabout where channels 92 alternately connect the opposite ends of said orifice passages 91 in a series relationship when elastomeric ring 89 is disposed within annular groove 94 formed in cover 30 and between bore 32 of housing 12 and the inside diameter 96 of annular groove 94 to form a restrictive pilot flow path and thereby provide the pressure drop means across diaphragm 36 to actuate said pressure responsive diaphragm 36 and valve member 40, the said restricted pilot flow path communicating chamber 14 to pilot chamber 34 via slotted passage 76, annular groove 68, screen passages 75, annular groove 67 to clearance 66, a slotted inlet passage 98 and an inlet orifice 100 formed in elastomeric ring 89 to said series orifice passages 91 and channels 92, outlet orifice 104 and slotted outlet passage 102 also formed in elastomeric ring 89 to clearance 66, pilot passage 106, and to pilot chamber 34. The embodiment shown by FIGS. 10, 11, 12, and 13 provides a similar restrictive flow path as illustrated by FIGS. 7, 8, and 9, but in addition, combines with the screening means as given in FIGS. 4, 5, and 6 for an additional foreign particle protection means.

Figure 14:
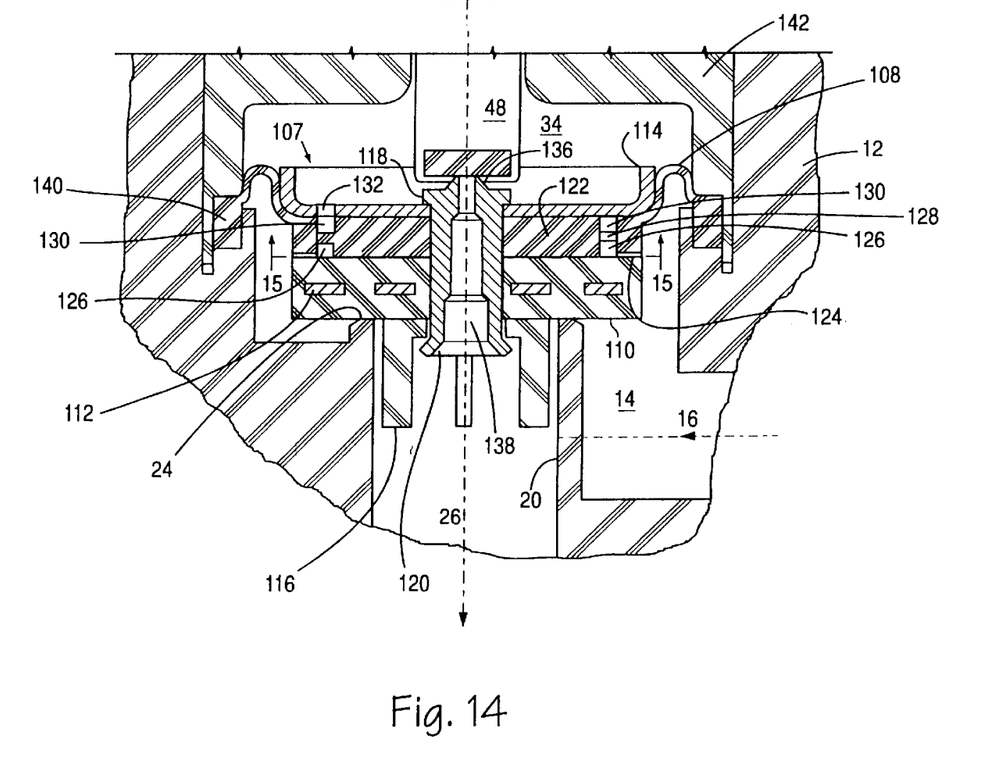
FIG. 14 is a cross-section view of another embodiment of the invention illustrating screen passages e i he central section of the flexible diaphragm.
Figure 15:
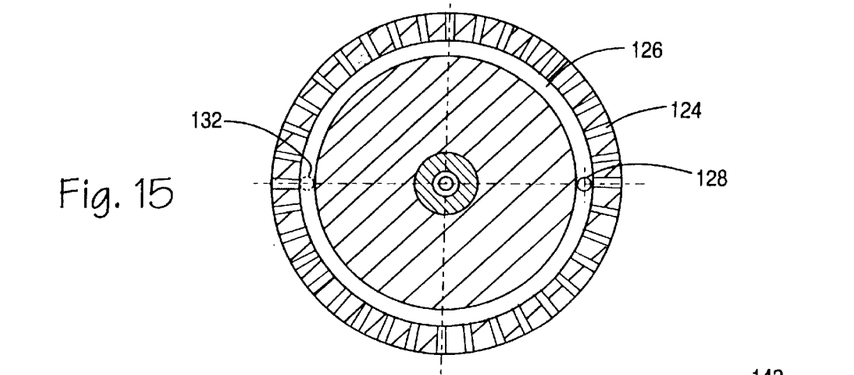
FIG. 15 is a section view taken along section indicating lines 15—15 of FIG. 14.

Referring to FIG. 1 and to FIGS. 14 and 15, a cross-sectional view of another embodiment is illustrated where a pressure responsive main valve member 107 of FIG. 14 replaces the diaphragm 36, valve member 40 and insert 42 of FIG. 1. In FIG. 14 the pressure responsive main valve member 107 comprises a flexible diaphragm 108, a main valve member 110 having an insert 112 molded therein, a rigid member 114, a retainer guide 116, a fastening member 118 riveted at 120 to axially and concentrically fasten together said diaphragm 108, valve member 110, rigid member 114, and retainer guide 116. Flexible diaphragm 108 having a central section 122 wherein a plurality of channels 124 to act as foreign particle screening means, are circumferentially spaced about the outer periphery of central section 122. Said channels 124 communicate with main valve chamber 14 and pilot chamber 34 via a pilot flow path 134 in pressure responsive main valve member and defined by said channels 124, lower annular groove 126, aperture 128, and upper annular groove 130, all formed in said central section 122 of diaphragm 108 when sandwiched between valve member 110 and rigid member 114 having an orifice 132 therein and thereby communicating to pilot chamber 34. The pilot chamber side of fastening member 118 has thereon a pilot seat 136 with a pilot flow passage 138 communicating said pilot chamber 34 and outlet passage 26 when said pilot seat 136 is opened by lifting of the actuator 48. Guide member 116 of pressure responsive main valve member 107 extends into bore 20 for sliding engagement with the wall thereof to act as a guide for movement of pressure responsive main valve member 107. A bead 140 at the outer periphery of flexible diaphragm 108 provides a fluid seal between housing 12 and a cover 142 to prevent external fluid leakage.

Figure 16:
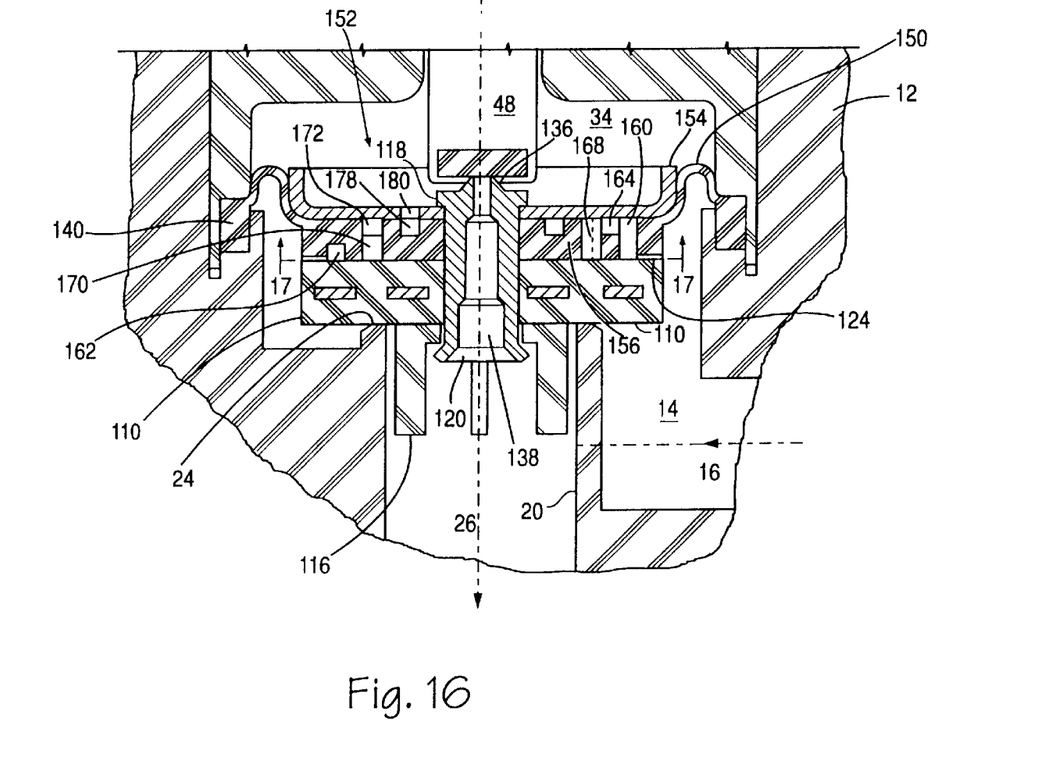
FIG. 16 is a cross-section view of a similar embodiment of FIG. 14 illustrating screening passages and series restrictor passages located in the central section of the flexible diaphragm.
Figure 17:
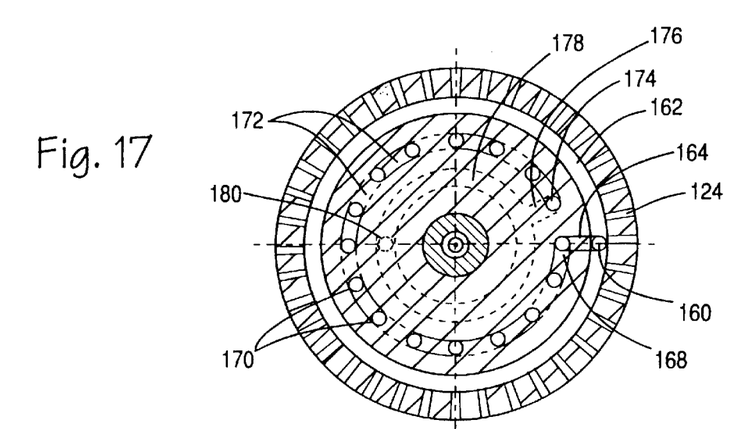
FIG. 17 is a section view taken along section indicating lines 17—17 of FIG. 16.

Referring again to FIGS. 14 and 15 and also to FIGS. 16 and 17, another embodiment is illustrated where a pressure responsive main valve member 152 replaces the FIG. 14 and 15 responsive main valve member 107. Referring to FIGS. 16 and 17, said pressure responsive main valve member 152 comprises flexible diaphragm 150, a main valve member 110, a rigid member 154, a retainer guide 116, and a fastening member 118 riveted at 120 to fasten together said diaphragm 150, valve member 110, rigid member 154, and retainer guide 116. Flexible diaphragm 150 having a central section 156 wherein a plurality of channels 124 are circumferentially spaced about the outer periphery of central section 156 to form a foreign particle screening means. Channels 124 communicate with main valve chamber 14 and pilot chamber 34 via a defined pilot flow path 158 formed by said channels 124 connecting with a lower annular channel 162 to restrictor passage 160 which is open to an upper radial passage 164 providing an entry to restrictor passage 168 and a series of restrictor passages 170; upper and lower connecting channels 172 alternately connect ends of said restrictor passages 170, to series exit restrictor passage 174, an exit radial connecting passage 176, upper annual groove 178, and to exit passage 180 in rigid member 154 to complete a defined pilot flow path 158 whereby a pressure drop means across said pressure responsive main valve member and a foreign particle screening means for said pilot flow path are attained.

Figure 18:
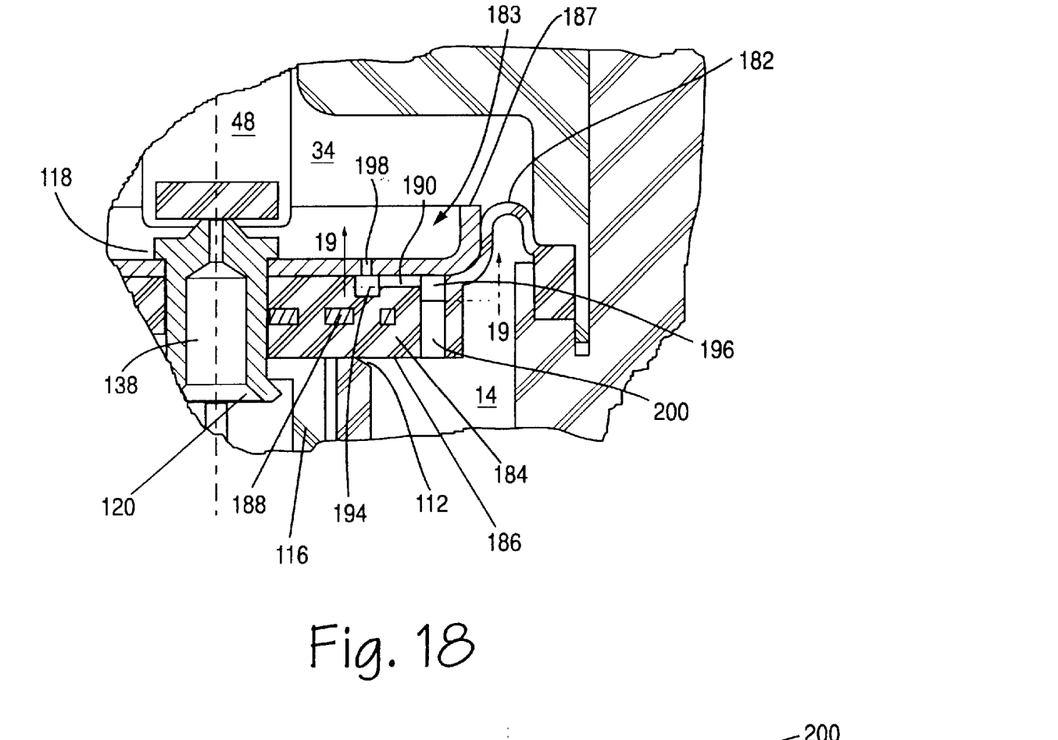
FIG. 18 is a portion of a section view of a valve similar to FIG. 14 illustrating an alternative means to form screen passages in the central section of the flexible diaphragm.
Figure 19:
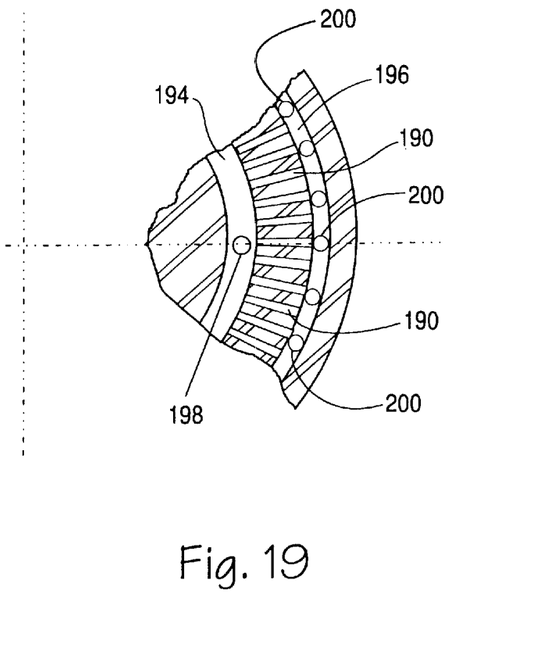
FIG. 19 is a section view taken along section indicating lines 19—19 of FIG. 18.

Reference to FIG. 18 and FIG. 19, a cross-section portion of an embodiment similar to that shown in FIG. 14 is illustrated. In FIG. 18, a flexible diaphragm 182 having a central portion 184 having a main valve member 186 with an insert 188 molded therein, a rigid member 187, a retainer guide 116, and a fastening member 118 when riveted at 120 fastens all said aforementioned members together to form a pressure responsive main valve member 183. Flexible diaphragm 182 within central portion 184 contains a plurality of channels 190 circumferentially spaced therein and in communication with an inner annular passage 194 and an outer annular passage 196 wherein inner annular passage 194 directly communicates bleed orifice 198 in rigid member 187 to chamber 34 and said outer annular passage 196 communicates chamber 14 directly through a plurality of passages 200 in a circumferential relation with said outer annular passage 196 to define a pilot flow path 192 across pressure responsive main valve member 183. Bleed orifice 198 is sized to provide a sufficient pressure drop to open pressure responsive main valve member 183 and passages 190 provide a foreign particle screening means of the pilot flow path. Passages 190 are sized smaller than bleed orifice 198 and thereby entrap any foreign particles of a size that could cause blockage of bleed orifice 198. Passages 200, although sized larger than passages 190, may be sized smaller than bleed orifice 198 and thereby could act as an additional foreign particle protection barrier against blockage of bleed orifice 198.

The orifice and channel passages formed in the various embodiments illustrated and described herein permits a larger passage area for an equivalent pressure drop than a single small area orifice as ordinarily used and thereby provides a much less likelihood of foreign particle clogging of this critical orifice section of a pilot bleed passage.

The FIGS. 14 through 19 embodiments define and employ similar foreign particle screening means as well as the generation of pressure differential means to open the pressure responsive main valve member (as was explained for the FIGS. 1 through 13) and therefore for those familiar in the state of the art of these types of valves, a repetition of further operational explanation is not deemed necessary.

Use of the screen means or series passage means separately or in combination thus provide a unique means to incorporate the described embodiments into pilot operated valves resulting in superior resistance to foreign particle blockage of their pilot passages. It should also be noted that the screen passage configurations and the series pressure drop patterns may be interchangeable among the variations illustrated and therefore not limited to a specific described illustration.

In operation, as shown in FIG. 1, the main valve member 40 of diaphragm 36 is in a closed position against valve seat 24 and spring 52 is biased to urge actuator 48 to close pilot seat 44. Upon energization of coil 50, actuator 48 is lifted from seat 44 to permit fluid flow from pilot chamber 34 through pilot passage 46 and outlet passage 26 whereby a sufficient pressure drop from main valve chamber 14 to pilot chamber 34 is created to generate an upward force acting upon a portion of diaphragm 36 to move valve member 40 from valve seat 24 and thereby allow main valve flow from inlet 18 to outlet 28. When coil 50 is de-energized, actuator 48 by force of spring 52 closes pilot seat 24 to stop pilot flow whereby the pressure differential between main valve chamber 14 and pilot chamber 34 is equalized to remove the net upward force across diaphragm 36 and thereby permit closure of valve seat 24 and stop flow from inlet passage 16 to outlet passage 26. In the valve operation, any of the screening embodiments described herein could be applied to provide the foreign particle protection of the pilot flow path.

It should also be noted that operation of Assembly 10 is dependent upon pressure differential between main valve chamber 14 and pilot chamber 34 and can be created by use of a single small diameter orifice as shown in FIGS. 1, 4, 14, 15, 18, and 19. The equivalent of the small diameter single orifice pressure drop may also be obtained by the use of a number of larger size series connected orifice passages as illustrated in the embodiment of FIGS. 7 through 13 and FIGS. 16 and 17. For example, if the diameter of the peripheral region of the diaphragm equals one inch, 10 to 20 orifice passages of 0.04 inch to 0.053 diameter could respectively be accommodated in a series connection arrangement that would provide the equivalent of a single 0.025 inch bleed orifice diameter. As this example illustrates, the series bleed hole orifice passages provide a significant increase of permissible area (3 to 4-½ times) that of the typical single 0.025 diameter orifice. In addition, the multiple orifice pressure drop means is more tolerant to the orifice diameter dimensional changes. A change of the 0.044 inch diameter orifice passage of the above example to a 0.048 inch diameter passage would provide a 0.027 inch single orifice equivalent diameter. Thus, in this example, the multiple orifice pressure drop means permits twice the dimensional orifice diameter tolerance change of the single orifice and thereby offers improved control of the upstream or bleed orifice pressure drop means of the pilot valve flow passage. The larger passages thus obtained, also provide the advantage of an improved valve foreign particle contamination tolerance.

The present invention thus provides pilot operated diaphragm valves a unique construction of the pilot flow path passage having improved resistance to foreign particle blockage as well as satisfying other objectives as previously set forth herein.

Although my invention has been described with respect to the illustrated embodiments, modifications and variations of my invention will be apparent to those having ordinary skill in the art after having read and understood the foregoing. Therefore, my invention is limited only by the following claims.

I claim:

1. A foreign particle resistant electric actuated pilot operated valve assembly comprising:
   a) a housing having a main fluid cavity with inlet and outlet passages in communication therewith;
   b) a main valve seat within said housing between said inlet and outlet passages;
   c) a pressure responsive flexible diaphragm having an enlarged peripheral section and a main valve member disposed in said main fluid cavity, said main valve member movable with respect to said housing from a closed position contacting said valve seat to an open position spaced apart from said seat to permit flow from said inlet to said outlet passage;
   d) means defining a pilot chamber where pressure responsive flexible diaphragm forms a portion thereof;
   e) a pilot flow path communicating said inlet passage, said pilot chamber, and said outlet passage, said pilot flow path having a pilot passage and bleed passage therein, said pilot passage and said bleed passage having a pressure drop relationship therebetween, said pressure responsive flexible diaphragm responsive to said pressure drop relationship;

f) a cover means having a cavity therein and forming a part of said pilot chamber, said cover means disposed within said main fluid cavity of said housing, said cover means and said main fluid cavity forming a clearance space therebetween, said cover means having a pilot flow bleed passage therein and with said clearance space form a part of said pilot flow path;

g) a pilot valve member within said pilot chamber and movable between a closed position preventing pilot flow through said pilot flow passage and an open position permitting pilot valve flow therethrough said pilot member operable upon electromagnetic energization and de-energization to move said pilot valve member to said open and closed positions to effect opening and closing of said main valve member;

h) a plurality of channel configurations formed in said main cavity of said housing to form a plurality of screening passages with said enlarged peripheral section of said diaphragm when said enlarged peripheral section is sandwiched between said cover means and said channel configurations, said screening passages forming a part of said pilot flow path and sized to prevent entry of foreign particles that could block said bleed passage and cause malfunction of said valve assembly.

2. The valve assembly defined in claim 1 wherein said enlarged peripheral section of said flexible diaphragm is received within an annular retaining means in said main cavity, said plurality of channel configurations formed in bottom of said retaining means to form a plurality of screening passages when said enlarged peripheral section of said flexible diaphragm is sandwiched between said cover means and said channel configurations.

3. The valve assembly defined in claim 1 wherein said plurality of screening passages are formed across said enlarged peripheral section of said diaphragm.

4. The valve assembly defined in claim 1 wherein said plurality of fluid passage configurations are formed when said enlarged peripheral section of said diaphragm is sandwiched between said cover and bottom of said cavity in said housing.

5. A foreign particle resistant electric actuated valve assembly comprising:

a) a housing having a main fluid cavity with inlet and outlet passages in communication therewith;

b) a main valve seat within said housing between said inlet and outlet passages;

c) a pressure responsive flexible diaphragm having an enlarged peripheral section and a main valve member disposed in said main fluid cavity, said man valve member movable with respect to said housing from a closed position contacting said valve seat to an open position spaced apart from said seat to permit flow from said inlet to said outlet passage;

d) means defining a pilot chamber where said pressure responsive flexible diaphragm forms a portion thereof;

e) a pilot flow path communicating said inlet passage, said pilot chamber, and said outlet passage, said pilot flow path having a pilot passage and bleed passage therein, said pilot passage and said bleed passage having a pressure drop relationship therebetween, said pressure responsive flexible diaphragm responsive to said pressure drop relationship;

f) a cover means having a cavity therein and forming a part of said pilot chamber, said cover means disposed within said main fluid cavity of said housing, said cover means and said main fluid cavity forming a clearance space therebetween, said cover means having a pilot flow passage therein and with said clearance space forming a part of said pilot flow path;

g) a pilot valve member within said pilot chamber and movable between a closed position preventing pilot flow through said pilot flow passage and an open position permitting pilot valve flow therethrough, said pilot member operable upon electromagnetic energization and de-energization to move said pilot valve member to said open and closed positions to effect opening and closing of said main valve member;

h) a plurality of restrictive orifice passages formed in said enlarged peripheral section of said flexible diaphragm, said restrictive orifice passages formed with at least two flow restrictive orifice passages communicating in a series flow relationship to form said bleed passage when said enlarged peripheral section of said flexible diaphragm is sandwiched between said cover means and said housing means, said series flow restrictive orifice bleed passages sized to produce said pressure drop relationship between said pilot passage and said bleed passage equivalent to the size of a single flow restrictive orifice needed to produce same said pressure drop relationship whereby said series flow restrictive passages provide a larger cross-sectional area than a said single flow restrictive orifice to permit said series flow restrictive bleed passage to have a larger cross-sectional area than a said single flow restrictive bleed passage orifice and thereby reduce the possibility of foreign particle blockage of said bleed passage.

6. The valve assembly defined in claim 5 wherein said bleed passage cross-sectional flow area is equal to or greater than said pilot passage flow area.

7. A foreign particle resistant electric actuated valve assembly comprising:

a) a housing having a main fluid cavity with inlet and outlet passages in communication therewith;

b) a main valve seat within said housing between said inlet and outlet passages;

c) a pressure responsive flexible diaphragm having enlarged peripheral section and a main valve member disposed in said main fluid cavity, said main valve member movable with respect to said housing from a closed position contacting said valve seat to an open position spaced apart from said seat to permit flow from said inlet to said outlet passage;

d) means defining a pilot chamber where said pressure responsive flexible diaphragm forms a portion thereof;

e) a pilot flow path communicating said inlet passage, said pilot chamber, and said outlet passage, said pilot flow path having a pilot passage and bleed passage therein, said pilot passage and said bleed passage having a pressure drop relationship therebetween, said pressure responsive flexible diaphragm responsive to said pressure drop relationship;

f) a cover means having a cavity therein and forming a part of sand pilot chamber, said cover means disposed within said main fluid cavity of said housing, said cover means and said main fluid cavity forming a clearance space therebetween, said cover means having a pilot flow passage therein and with said clearance space form a part of said pilot flow path;

g) a cover means having cavity therein and forming a part of said pilot chamber, said cover means disposed within said main fluid cavity of said housing, said cover means and said main fluid cavity forming a clearance space therebetween, said cover means having a pilot flow passage therein and with said clearance space form a part of said pilot flow path; and;

h) a plurality of restrictive orifice passages formed within a ring member, said restrictive orifice passages formed with at least two flow restrictive orifice passages communicating in a series flow relationship to form said bleed passage when said ring member is positioned between said cavity of said housing and said cover means, said series flow restrictive orifice passages sized to produce said pressure drop relationship between said pilot passage and said bleed passage equivalent to the size of a single flow restrictive orifice needed to produce same said pressure drop relationship whereby said series flow restrictive orifice passages provide a larger cross-sectional area than said single flow restrictive orifice to permit said series flow restrictive orifice bleed passage to have a larger cross-sectional area than a said single flow restrictive bleed passage orifice and thereby reduce the possibility of foreign particle blockage of said bleed passage.

8. The valve assembly defined in claim 7 wherein said bleed passage cross-sectional flow area is equal to or greater than said pilot passage flow area.

9. A foreign particle resistant electric actuated valve assembly comprising:

a) a housing having a main fluid cavity with inlet and outlet passages in communication therewith;

b) a main valve seat within said housing between said inlet and outlet passages;

c) a pressure responsive flexible diaphragm having an enlarged peripheral section and a main valve member disposed in said main fluid cavity, said main valve member movable with respect to said housing from a closed position contacting said valve seat to an open position spaced apart from said seat to permit flow from said inlet to said outlet passage;

d) means defining a pilot chamber where said main valve member forms a portion thereof;

e) a pilot flow path communicating said inlet passage, said pilot chamber, and said outlet passage, said pilot flow path having a pilot passage and bleed passage therein, said pilot passage and said bleed passage having a pressure drop relationship therebetween, said pressure responsive flexible diaphragm responsive to said pressure drop relationship;

f) a cover means having a cavity therein and disposed within said main fluid cavity of said housing, said cover means and said main fluid cavity forming a clearance space there between, said cover means having a pilot flow bleed passage therein and with said clearance space form a part of said pilot flow path;

g) a pilot valve member within said pilot chamber and movable between a closed position preventing pilot flow through said pilot flow passage and an open position permitting pilot valve flow therethrough, said pilot member operable upon electromagnetic energization and de-energization to move said pilot valve member to said open and closed positions to effect the opening and closing of said main valve member;

h) a ring member disposed in said main cavity of said housing, said ring member having a plurality of fluid passage configurations formed thereon, said ring member sandwiched between bottom of said main valve cavity and said enlarged peripheral section of said diaphragm when said cover means is received in said housing means, whereby said plurality of fluid passage configurations form screening passages, said screening passages a part of said pilot flow path and sized to prevent entry of foreign particles that could block said bleed passage and cause malfunction of said valve assembly.

10. A flexible diaphragm assembly for a foreign particle resistant electrically actuated pilot valve assembly comprising:

a) a pressure responsive flexible diaphragm having an enlarged peripheral section and a central main valve member section, said flexible diaphragm operable by said electrically actuated pilot valve, said pilot valve having a pilot passage and a bleed passage associated therewith;

b) a plurality of channel configurations formed on one side of said main valve member and a valve seat sealing means on its opposite side said open sided channel configurations formed parallel to a plane perpendicular to the axial axis of said main valve member, said enlarged peripheral section of said flexible diaphragm forming a peripheral gasket sealing means;

c) a rigid member having a pilot bleed passage therein, said rigid member associated with said flexible diaphragm said rigid member providing a closure for said open sided channel configurations when said rigid member engages with said one side one side of said main valve member to thereby form a plurality of screening passages, and engaging said plurality of said channel configurations to form a plurality of screening passages, each said screening passage in a series flow relationship with said bleed passage and communicating opposite sides of said flexible diaphragm, said screening passages sized to prevent entry of foreign particles that would cause blockage of said bleed passage.

11. The valve assembly defined in claim 10 wherein said sized screening passages direct said pilot valve flow inwardly toward said main valve seat.

12. The flexible diaphragm assembly defined in claim 10 wherein said rigid member extends through central region of said main valve member, said rigid member having a pilot seat and pilot passage formed therein, said pilot passage extending centrally through said insert, said pilot seat and said pilot passage opened and closed by said electrically actuated pilot valve.

13. A foreign particle resistant electrically actuated pilot valve assembly comprising:

a) a housing having a main fluid cavity with inlet and outlet passages in communication therewith;

b) a main valve seat within said housing between said inlet and outlet passages;

c) a pressure responsive flexible diaphragm having an enlarged peripheral section and a main valve member associated therewith, said diaphragm and said main valve member forming a pressure responsive flexible diaphragm assembly disposed in said main fluid cavity, said main valve member movable with respect to said housing from a closed position contacting said valve seat to an open position spaced apart from said seat to permit flow from said inlet to said outlet passage;

d) means defining a pilot chamber where said pressure responsive flexible diaphragm forms a portion thereof;

e) a pilot flow path communicating said inlet passage, said pilot chamber, and said outlet passage, said pilot flow path having a pilot passage and bleed passage therein;

f) a cover means having a cavity therein and disposed within said main fluid cavity of said housing, said cover means and said main fluid cavity forming a clearance space therebetween, said cover means having a pilot flow passage therein and with said clearance space form a part of said pilot flow path;

g) a pilot valve member movable between a closed position preventing pilot flow through said pilot flow passage and an open position permitting pilot valve flow therethrough, said pilot member operable upon electromagnetic energization and de-energization to move said pilot valve member to said open and closed positions to effect opening and closing of said main valve member;

h) a plurality of restrictive orifice and channel passages formed in said enlarged central section of said flexible diaphragm, said restrictive orifice passages and said channel passages forming at least two flow restrictive orifice passages in a series flow relationship to form said bleed passage in said diaphragm assembly when said enlarged central section of said flexible diaphragm is sandwiched between said main valve member and said rigid member, said series flow restrictive bleed passages sized to produce said pressure drop relationship between said pilot passage and said bleed passage equivalent to the size of a single flow restrictive orifice needed to produce same said pressure drop relationship whereby said series flow restrictive passages provide a larger cross-sectional area than said single flow restrictive orifice to permit said series flow restrictive bleed passage to have a larger cross-sectional area than a said single flow restrictive bleed passage orifice and thereby reduce the possibility of foreign particle blockage of said bleed passage.

14. The valve assembly defined in claim 13 wherein said bleed passage cross-sectional flow area is equal to or greater than said pilot passage flow area.

15. A flexible diaphragm assembly for a foreign particle resistant electrically actuated pilot valve assembly comprising:

a) a pressure responsive flexible diaphragm having an enlarged peripheral section and an enlarged central section, said flexible diaphragm operable by said electrically actuated pilot valve, said pilot valve having a pilot passage and bleed passage associated therewith;

b) a main valve member operable with said pressure responsive flexible diaphragm, said main valve member providing a valve sealing means, said pressure responsive flexible diaphragm operable by a pressure drop relationship between said pilot passage and said bleed passage;

c) a rigid member associated with said flexible diaphragm and said main valve member;

d) a plurality of restrictive orifice and channel passages formed in said enlarged central section of said flexible diaphragm, said restrictive orifice passages and said channel passages forming at least two flow restrictive orifice passages in a series flow relationship to form said bleed passage when said enlarged central section of said flexible diaphragm is sandwiched between said main valve member and said rigid member to form said pressure responsive flexible diaphragm assembly, said series flow restrictive bleed passages sized to produce said pressure drop relationship between said pilot passage and said bleed passage equivalent to the size of a single flow restrictive orifice needed to produce same said pressure drop relationship whereby said series flow restrictive passages provide a larger cross-sectional area than said single flow restrictive orifice to permit said series flow restrictive bleed passage to have a larger cross-sectional area than a said single restrictive orifice bleed passage and thereby reduce the possibility of foreign particle blockage of said bleed passage.

16. The valve assembly defined in claim 15 wherein said bleed passage cross-sectional flow area is equal to or greater than said pilot passage cross-sectional flow area.

* * * * *